United States Patent
Doty

[11] Patent Number: 5,839,790
[45] Date of Patent: Nov. 24, 1998

[54] REMOTE MECHANICAL SENSOR AND SEAT BELT RETRACTOR OPERATED THEREBY

[75] Inventor: Gerald Arthur Doty, Auburn Hills, Mich.

[73] Assignee: Takata Inc., Auburn Hills, Mich.

[21] Appl. No.: 467,076

[22] Filed: Jun. 6, 1995

[51] Int. Cl.$^6$ .................................................. A47C 31/00
[52] U.S. Cl. ........................................... 297/478; 297/480
[58] Field of Search .................................. 297/480, 476, 297/478, 479; 242/381.4, 383, 383.2, 383.4, 384, 384.2, 384.5; 280/806

[56] References Cited

U.S. PATENT DOCUMENTS

| | | | |
|---|---|---|---|
| 2,708,966 | 5/1955 | Davis | 155/189 |
| 2,883,123 | 4/1959 | Finnigan | 242/107.4 |
| 3,248,069 | 4/1966 | Nichols | 242/107.4 |
| 3,552,676 | 1/1971 | Weber | 242/107.4 |
| 3,700,183 | 10/1972 | Rex | 242/107.4 |
| 3,901,461 | 8/1975 | Stephenson et al. | 242/107.4 |
| 3,913,862 | 10/1975 | Stephenson et al. | 242/107.4 |
| 3,915,401 | 10/1975 | Takada | 242/107.4 |
| 3,938,754 | 2/1976 | Stephenson et al. | 242/107.54 |
| 3,946,965 | 3/1976 | Singh | 242/107.4 R |
| 3,995,788 | 12/1976 | Stephenson et al. | 242/107.4 A |
| 4,004,751 | 1/1977 | Weman et al. | 242/107.4 A |
| 4,007,802 | 2/1977 | deRosa | 180/82 C |
| 4,039,158 | 8/1977 | Weman | 242/107.4 A |
| 4,046,332 | 9/1977 | Wheeler et al. | 242/107.4 A |
| 4,063,695 | 12/1977 | Oshikawa | 242/107.4 A |
| 4,103,754 | 8/1978 | Ashworth et al. | 180/82 C |
| 4,103,842 | 8/1978 | Martin et al. | 242/107.4 A |
| 4,164,337 | 8/1979 | Blom | 242/107.4 A |
| 4,244,600 | 1/1981 | Takada | 280/803 |
| 4,262,858 | 4/1981 | Takada | 242/107.4 A |
| 4,331,304 | 5/1982 | Matsuoka et al. | 242/107.4 A |
| 4,343,444 | 8/1982 | Francis | 242/107.4 A |
| 4,428,545 | 1/1984 | Naitoh | 242/107.4 A |
| 4,438,551 | 3/1984 | Imai | 24/68 SB |
| 4,467,981 | 8/1984 | Mori et al. | 242/107.4 A |
| 4,492,348 | 1/1985 | Ziv et al. | 297/480 X |
| 4,610,480 | 9/1986 | Yamada et al. | 297/478 |
| 4,629,142 | 12/1986 | Nöhren et al. | 242/107.4 B |
| 4,705,922 | 11/1987 | Seeger et al. | 200/61.45 M |
| 4,708,364 | 11/1987 | Doty | 280/806 |
| 4,708,366 | 11/1987 | Doty . | |
| 4,717,088 | 1/1988 | Fohl | 297/480 X |
| 4,763,853 | 8/1988 | Andersson | 242/107.4 A |
| 4,763,926 | 8/1988 | Doty . | |
| 4,907,820 | 3/1990 | Fohl | 297/480 X |
| 4,934,626 | 6/1990 | Kimura | 242/107.4 A |
| 4,948,171 | 8/1990 | Knabel et al. | 280/806 |
| 5,072,968 | 12/1991 | Hamaue | 280/806 |
| 5,098,030 | 3/1992 | Kosugi | 242/107 |
| 5,169,173 | 12/1992 | Nishizawa | 280/806 |
| 5,222,387 | 6/1993 | Hamaue | 73/1 D |
| 5,289,986 | 3/1994 | Hoshihara | 242/107.4 A |
| 5,335,941 | 8/1994 | Föhl | 280/206 |
| 5,451,009 | 9/1995 | Rumpf | 242/383.1 |
| 5,457,991 | 10/1995 | Nishizawa | 73/493 |

FOREIGN PATENT DOCUMENTS

| | | |
|---|---|---|
| 26 45 456 | 4/1978 | Germany . |
| 2235124 | 2/1991 | United Kingdom . |

*Primary Examiner*—Milton Nelson, Jr.
*Attorney, Agent, or Firm*—Fitch, Even, Tabin & Flannery

[57] ABSTRACT

A seat belt actuator may be spaced from and mounted at an attitude to the vertical that is different than the attitude of the retractor. Preferably, the remote actuator is connected by a looped cable to the retractor to actuate the retractor to its blocking position to stop belt protraction. Herein, the retractor is mounted on a tiltable seat back of a vehicle seat that changes its attitude to the vertical while the remote inertia-sensitive actuator is mounted in the seat rest of the vehicle seat and does not change its attitude. The cable turns a gear in both the remote actuator and in the retractor. An inertia flywheel sensitive to rotation, or an inertia, weight sensitive to acceleration or deceleration, when deceleration is above the predetermined amount, stops rotation of the gear at the remote actuator. The gear stops the attached cable from rotating; and the cable stops the rotation of a gear in the retractor thereby causing an actuation of a retractor main pawl into a toothed gear to block reel rotation and belt protraction.

8 Claims, 4 Drawing Sheets

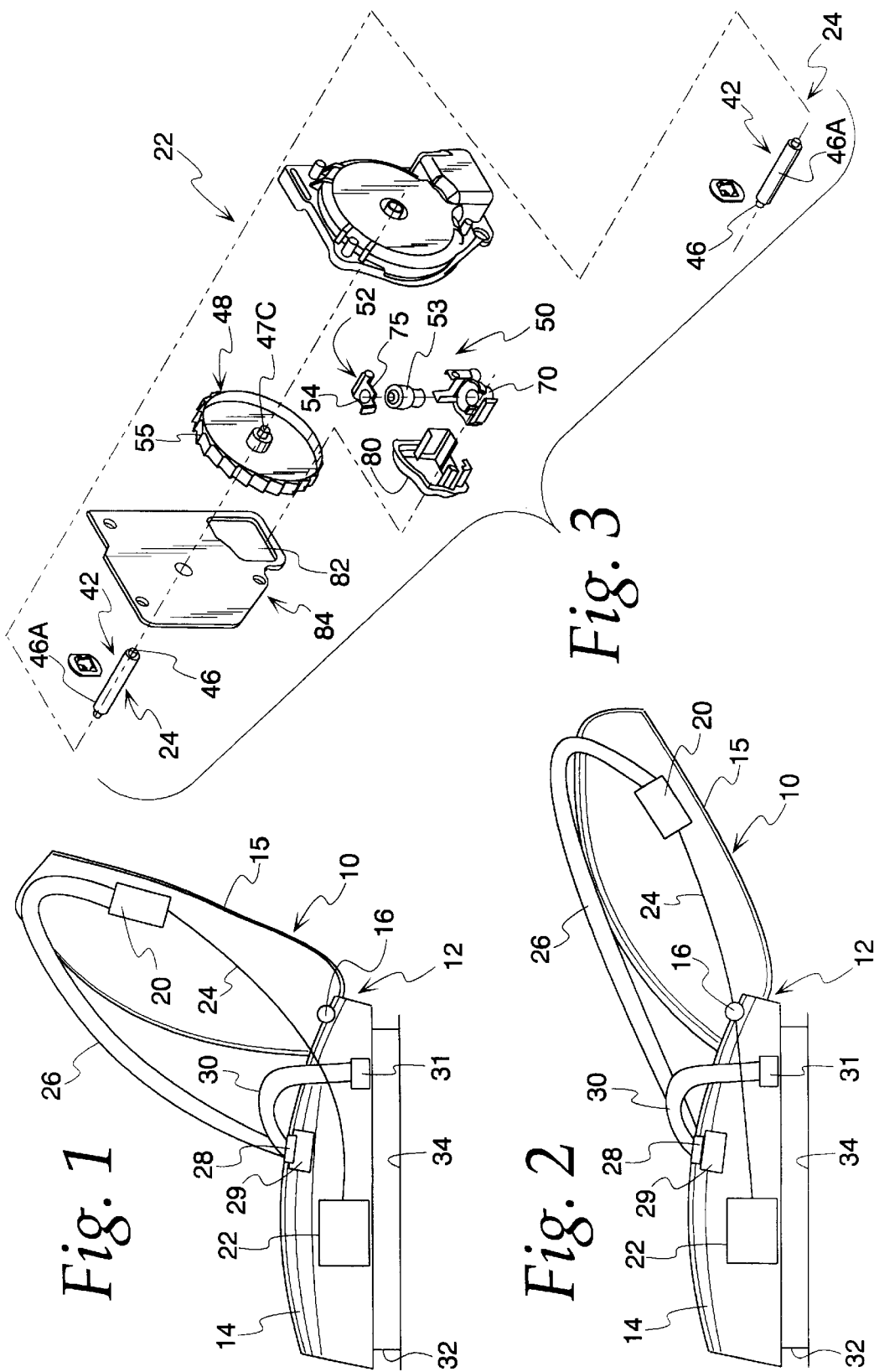

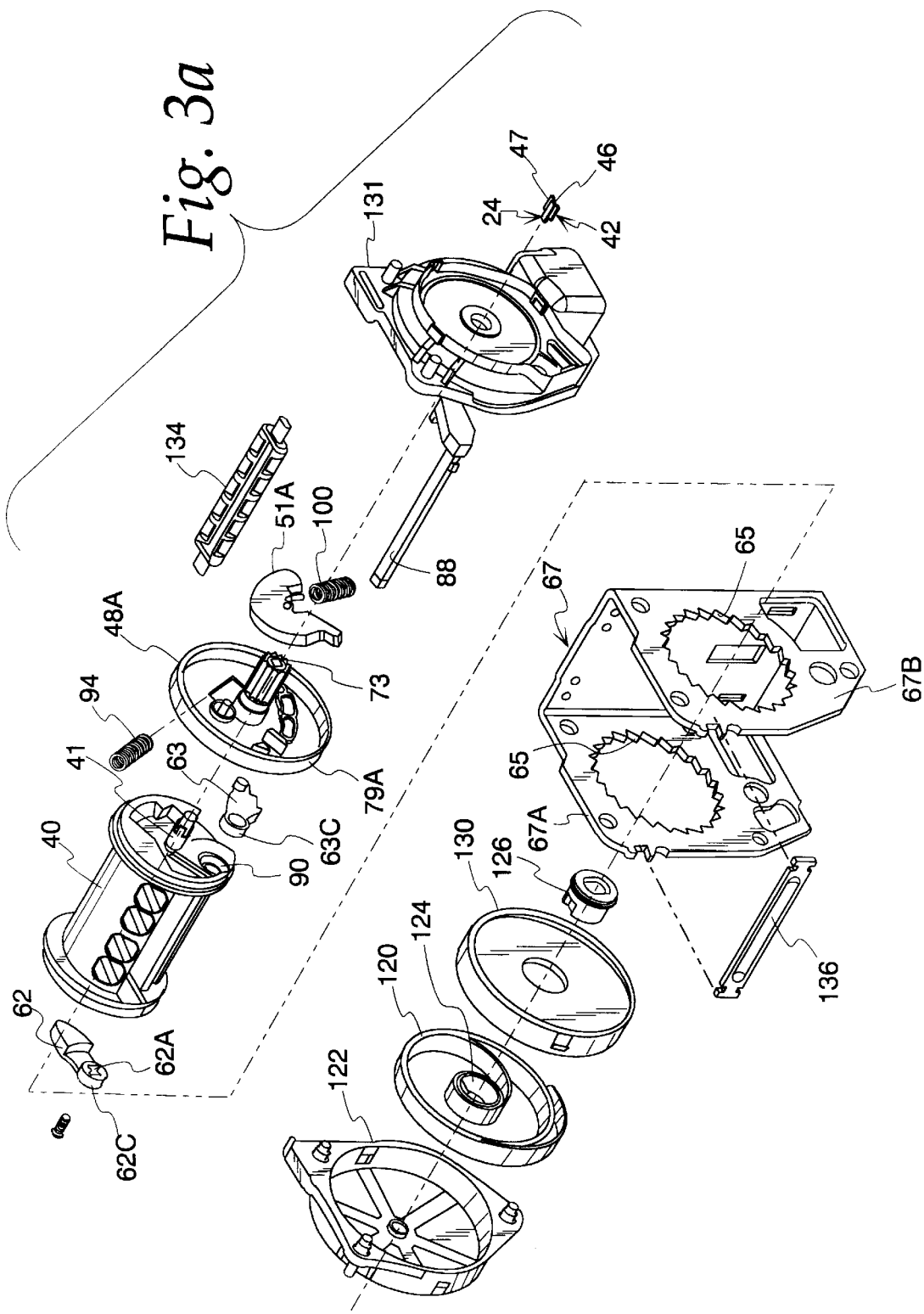

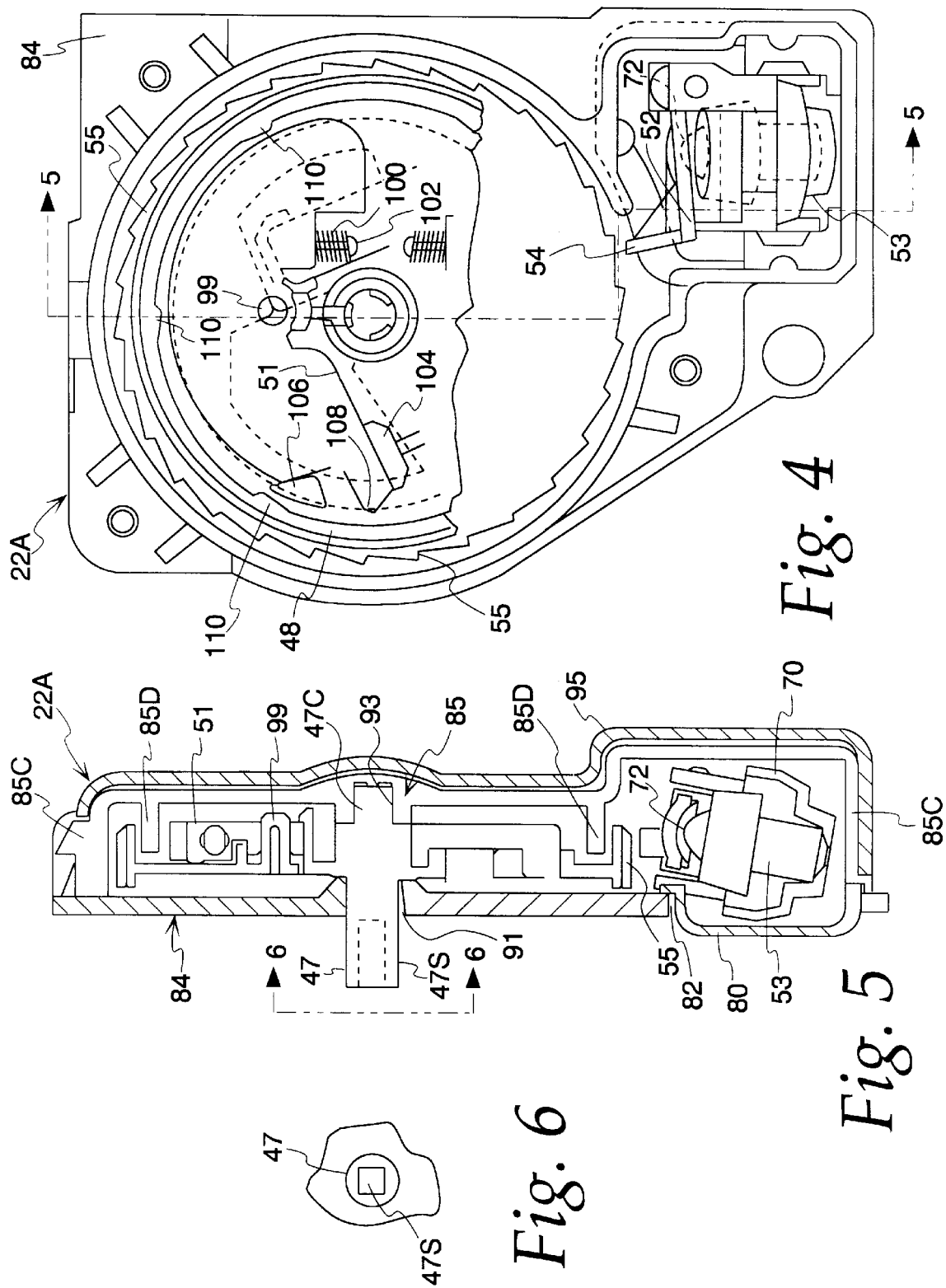

REMOTE MECHANICAL SENSOR AND SEAT BELT RETRACTOR OPERATED THEREBY

BACKGROUND OF THE INVENTION

This invention relates to seat belt retractors and to remotely located inertial actuators that are mechanically connected to the retractor to operate the same.

This invention is directed to providing a remote actuator that is vehicle-sensitive and/or webbing-sensitive to accelerations and decelerations to shift a safety belt retractor from its release position, allowing belt protraction to its locking or blocking position preventing belt protraction. In many instances, it is desired to locate a retractor in a position where the vehicle-sensitive inertia mechanism is disposed at an angle where the inertia weight is not at an attitude to be effective to actuate the reel locking mechanism. For example, when the retractor is mounted in a tiltable seat back rest, which may be adjusted to various rearwardly-inclined positions. One proposed solution for mounting a seat belt retractor in a reclinable seat back rest is disclosed in published United Kingdom patent application 2,235,124. In this patent, there is disclosed a pivotally mounted vehicle-sensitive inertia device which is pivotally mounted on the retractor, and a cable extends from the pivotal mounting seat mounting to a gear located at this seat back mounting. The inclining of the seat back rest rotates the gear which turns a flexible cable to rotate the inertia device's mounting to keep the vehicle-sensitive inertial weight therein in a generally horizontal plane. It has also been proposed, as disclosed in U.S. Pat. No. 3,915,401, to provide either an electrical operation and a mechanical operation of a retractor-locking mechanism by a remotely located, vehicle-sensitive inertial device. In both this published application and in the aforementioned patent, very special retractors are built for operation by the remote sensors. In some instances, it is not desired to rely on an electrical circuit to operate the retractor to its blocking position. Also, such circuitry can add significantly to the manufacturing and installation costs for the retractor assembly.

The costs of tooling and the costs of building of special retractors and the costs for special installation, such as connecting circuitry to inclinable seat backs, is to be avoided, if possible. It would be preferable if a standard retractor, that is already economically constructed, could be used and connected to a remote actuator with no or a few small changes thereto. That is to say, it would be preferred that an existing, commercially-proven vehicle and/or webbing-sensitive retractor be capable of being mechanically attached to a remote vehicle-sensitive actuator so that the retractor may be mounted in a location of a changing attitude or at an attitude where its vehicle-sensitive weight, if present, would be inclined very substantially to the vertical.

While it has been proposed to provide remote actuators with vehicle-sensitive devices, such as disclosed in U.S. Pat. No. 3,915,401, these proposals lack a remote web-sensitive actuation capability. Hence, there is a need for a remote actuator that is mechanically connected to a retractor and operates the same upon detection of either a vehicle or webbing acceleration or deceleration.

SUMMARY OF THE INVENTION

In accordance with the present invention, a seat belt retractor may be mounted in various attitudes and connected mechanically to a remote, inertia actuator that is vehicle-sensitive and/or webbing-sensitive. The preferred retractor is an inertia locking retractor of substantially conventional manufacture; and the preferred, remote inertia sensor uses this retractor's same kind of proven inertia sensitive device or devices at a remote location to operate through a mechanical connector the retractor's locking mechanism in the same general manner that its internal inertia-sensitive devices would operate the locking mechanism. The remote actuator acts as a trigger or actuator for the retractor's blocking mechanism; and hence, the remote actuator mechanism may be made with plastic, rather than with metal parts, because the plastic parts do not have to handle the heavy loads that the metal parts in the retractor must handle.

The preferred remote actuator may also have a web-sensitive device for sensing when the belt webbing is being protracted at an acceleration that is indicative of an accident. The remote web-sensitive device preferably operates through a cable-kind of mechanical connector which has a rotatable shaft within a cable sheath. Thus, the web acceleration at the reel is communicated by rotation of the shaft to the remote, inertia-sensitive device. The retractor may or may not have a web-sensitive device that acts as a fail-safe and is redundant to the vehicle-sensitive device of the remote actuator.

In accordance with a further aspect of the invention, a remote actuator is mounted in a seat rest of a seat, and the retractor is mounted in the back rest with a mechanical connector extending between the remote actuator and the retractor. The seat back may be tilted forwardly or rearwardly into various attitudes relative to the vertical. Irrespective of the attitude of the seat back, the remote actuator will actuate the retractor's blocking mechanism to block belt protraction at predetermined vehicle and/or belt accelerations or decelerations. Preferably, the connector is a rotatable cable that is flexible and is looped to allow its position to be straightened as the seat back is tilted rearwardly.

BRIEF DESCRIPTION OF THE DRAWINGS

FIG. 1 is a diagrammatic view of the retractor mounted on a seat back rest and the remote, inertia-sensitive device mounted on the seat with a mechanical connector therebetween;

FIG. 2 is a view similar to FIG. 1 with the back rest fully inclined to change the attitude of the retractor on the back rest;

FIG. 3 is an exploded view of a remote, vehicle-sensitive actuator embodying novel features of the present invention, FIG. 3A is an exploded view of a seat belt retractor connected by a mechanical connector in the form of a rotatable cable to the remote, inertial-sensitive actuator of FIG. 3;

FIG. 4 is an enlarged, elevational view of another embodiment of the invention having a remote web-sensitive, actuator device;

FIG. 5 is a cross-sectional view when viewed along the line 5—5 of FIG. 4;

FIG. 6 is an end view of a shaft taken along the line 6—6 of FIG. 5;

DETAILED DESCRIPTION OF THE PREFERRED EMBODIMENT

Figure 7:
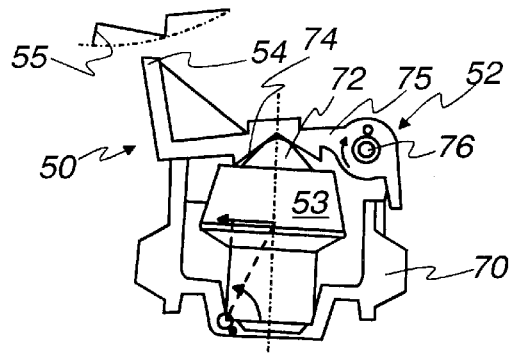
FIG. 7 is an enlarged, elevational view of the vehicle-sensitive inertia assembly.
Figure 8:
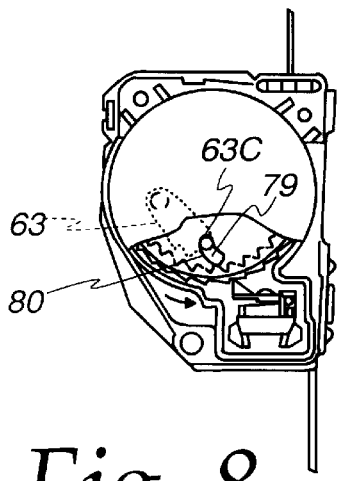
FIGS. 8, 9 and 10 are sequential views showing the camming of a pawl into engagement with gears on the retractor frame by cam surfaces of a lock gear.
Figure 9:
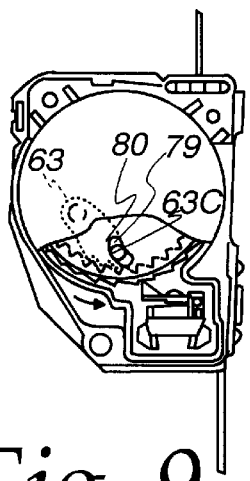
Figure 10:
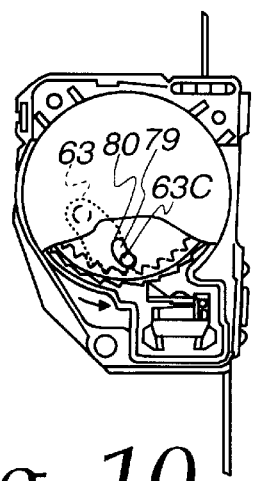
Figure 11:
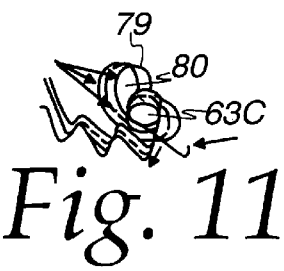
FIG. 11 is an enlarged, fragmentary view of the camming of the pawl into engagement with the gears on the retractor frame.
Figure 12:
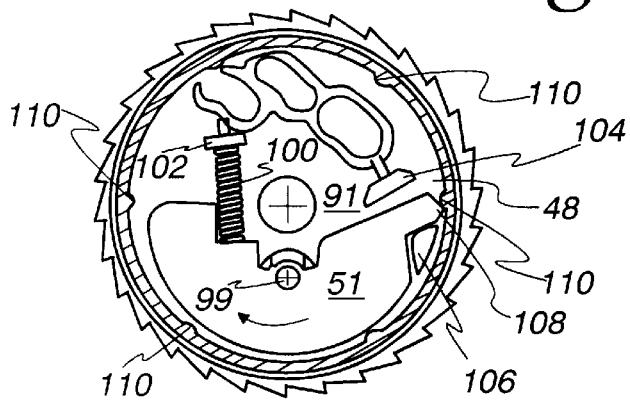
FIG. 12 is a cross-sectional view of a flywheel engaging an internal projection on the rotatable lock gear.
Figure 13:
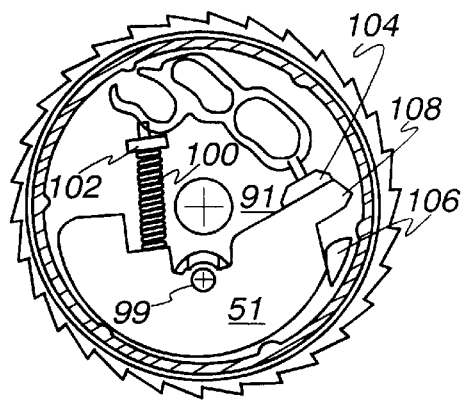
FIG. 13 is a view similar to FIG. 12 with the flywheel in its inoperative position.

As shown in the drawings for purposes of illustration, the invention is embodied in an apparatus 10 that is mounted on a passenger seat 12 (FIGS. 1 and 2) of a vehicle that includes a lower seat rest 14 and a pivotal back rest 15 that pivots about a pivot means 16 therebetween. The seat belt apparatus 10 includes a seat belt retractor 20 and a remote, inertia sensor and actuator device 22 mounted on the seat rest 14. A mechanical connector 24 extends between the retractor 20 and the remote, inertia sensor device 22 to operate the retractor to its web-blocking position irrespective of the degree of inclination of the seat back rest 15. In FIG. 1, the retractor 20 is substantially in a vertical attitude; whereas, in FIG. 2, the retractor is substantially in a horizontal altitude.

The seat belt mechanism includes a shoulder belt 26 extending from the retractor 20 to a tip or tongue plate 28 that is fastened to a conventional seat belt buckle 29 (FIG. 1) mounted on the seat frame. A lap belt 30 extends from the tip across the lap of a person (not shown) on the seat to a fixed anchor 31, also mounted on the seat frame. The entire seat is mounted on a conventional slide mechanism mounted on a vehicle floor 34 that allows the seat to be shifted forwardly or rearwardly. Because the entire seat belt mechanism is mounted on the seat, the seat belt mechanism travels forwardly and rearwardly as the seat travels along the seat slide on the vehicle frame.

It will be appreciated that the retractor 20 and remote, inertia sensor actuator device 22 could be mounted anywhere on the vehicle. The illustration of the mounting of the actuator on the seat 12 is only one of many different installations in which the attitude of the retractor differs from the attitude of the actuator. For example, the retractor 20 could be mounted on an inclined position on a vertical pillar of the vehicle body, and the inertia sensor and actuator device 22 could be mounted on the vehicle floor. In accordance with an important aspect of the invention, the seat 12 may be provided with a seat belt assembly that includes a shoulder belt retractor 20 in the seat back rest 15, and the lap portion of the seat belt extending across the vehicle seat rest 14 to be connected to opposite lateral sides of the seat. The entire seat belt assembly travels forwardly and rearwardly with the seat and the retractor's blocking mechanism blocks shoulder belt protraction irrespective of the attitude of the seat back relative to the true vertical.

The retractor illustrated herein and its web-sensitive, inertia operating mechanism and its vehicle-sensitive, inertial mechanism are commercially available from Takata Inc. of Auburn Hills, Mich. Hence, the operation thereof will only be briefly described. Other retractors with other forms of web-sensitive mechanisms can be substituted for those illustrated and described herein and all within the purview of this invention.

Also, in accordance with the present invention, the remote, inertia sensor device 22 is vehicle acceleration or deceleration sensitive (FIG. 3). There will be later described in connection with FIG. 4 a remote, inertia sensor device 22a that is both vehicle and web-sensitive. When the shoulder belt is protracted at a high acceleration, as at the time of an accident, the shoulder belt webbing 26 is payed out from the retractor reel 40 (FIG. 3A) at high speed and rotates its reel shaft 41, which is connected by the connector 24, which preferably comprises a cable 42, to the inertia sensor and actuator device 22. The cable 42 has an interior rotating shaft 46 that is connected at the remote actuator device 22 to a rotatable spindle 47 (FIGS. 3–6) on which is fastened a rotatable lock gear or ratchet wheel 48. If the vehicle is suddenly decelerating, as at the time of an accident, an inertia weight 53 (FIG. 3) in a vehicle-sensitive sensor or sensing means 50, at the inertial sensor and actuator device 22, tilts and lifts a pawl or pick 52 to engage teeth of the rotating lock gear 48 to stop its rotation and thereby, stop rotation of the cable shaft 46, as above-described. As will be explained in greater detail hereinafter, the stopping of the cable shaft rotation and connected gear 48a at the retractor while the webbing is continuing to pay out causes an actuation of the retractor locking mechanism in the retractor such that a main pawl 63 and a back-up pawl 62 on the reel 40 have blocking engagement with gear teeth 65 formed on the retractor frame 67.

While the connector 42 between the retractor 20 and the remote sensor and actuator 22 may take many forms such as gears, the preferred connector 24 is a wire cable shaft 46 in an encircling sheath 46a. The preferred cable is a relatively stiff Bowdein wire cable or the like that can bend and change its shape, e.g., from a looped, concave arcuate-shape in FIG. 1 to an almost horizontal straight line configuration in FIG. 2. A flexible and bendable cable connector allows for easier installation of the remote actuator device 22 and the retractor at various places in the vehicle.

It will be appreciated that a web-sensitive device having a flywheel (51 or 51a) may be mounted in a remote sensor 22 (FIGS. 4 and 5), or that there may be a flywheel, web-sensitive device at the retractor 20. In the first embodiment of the invention illustrated in FIG. 3, there is a web-sensitive device having a flywheel 51a (FIG. 3A) on the retractor 20, and there is no flywheel at the remote actuator 22. In another embodiment of the invention, which is shown in FIGS. 4 and 5, a flywheel 51 is present at the remote actuator 22a. In the embodiment of FIG. 4, the remote actuator 22a has both a vehicle-sensitive inertia means 50 having the inertia weight 53 and a web-sensitive means having the flywheel 51. If web-sensitive flywheel means are provided at both the retractor and the remote actuator 22a, one of them merely acts as a fail-safe device for the other.

Turning now to further describe the apparatus in greater detail, the vehicle-sensitive actuator 50 of the remote, inertia sensor and actuator device 22 will be first described. As best seen in FIGS. 3, 5 and 7, the inertia weight 53 is mounted to stand vertically in a sensor case 70 for tipping movement at vehicle deceleration to pivot a rounded nose 72 on the weight to lift the pivotally-mounted actuator pick 52 to insert its upturned finger 54 into the outer, peripheral teeth 55 of the rotating lock gear 48 to arrest the turning of the lock gear. The upper, rounded end 72 (FIG. 7) of the weight 53 is positioned within and engages a concave seat 74 (FIG. 7) on the underside of the pick 52, which is in the form of a lever 75 that is pivotally mounted on a pivot pin 76 in a sensor case 70. This case 70 and a housing cover 80 therefore are inserted into and secured at a support opening 82 (FIGS. 3 and 4) in a vertical support plate 84 of the remote actuator device 22.

At the time of vehicle deceleration of sufficient magnitude, the weight 53 topples to lift the finger 54 of the pick 52 into engagement with the teeth of the lock gear 48. The lock gear 48 will be turning because the cable wire 46 will be rotating it because the reel 40 and its reel shaft 41 will be turning due to the seat belt protraction as the passenger's body is moving relative to the seat.

As best seen in FIG. 5, the lock gear 48 at the remote sensor device 22a is preferably integrally molded with the spindle shaft 47 from plastic to be one piece with the spindle. The spindle shaft 47, as best seen in FIG. 5, is journaled for rotation at an opening wall 91 in the frame plate 84 and has its opposite end 47c journaled in a seat 93 formed in the other stationary frame plate 85. A square socket 47s (FIGS. 5 and 6) is formed in the spindle end and it receives a square end of the Bowdein wire 46 to rotate the spindle 47. The other end of the Bowdein wire is inserted into a similar spindle square socket 73 (FIG. 3A) at the gear 48a. The stationary frame plate 85 has an outer annular portion 85c that is joined to and abuts the outer peripheral area of the vertical, stationary support plate 84 to provide an enclosed housing for the web-sensitive and vehicle-sensitive devices, which are shown in FIGS. 4 and 5. A plastic cover 95 (FIG. 5) may be secured to the outer face of the stationary frame plate 85, as best seen in FIG. 5.

Thus, it will be seen that the toppled inertia weight 53 (FIG. 3) in the remote actuator 22 stops rotation of the gear 48 at the remote actuator; and through the Bowdein wire cable 46, stops rotation of the gear 48a (FIG. 3A) at the retractor. The stopping of rotation of the gear 48a results in the pawls 62 and 63 engaging the gear teeth 65 in the retractor frame, as will now be described in connection with FIGS. 8–13. The gear 48 has formed therein cam surfaces 79 which are sides of curved holes 80 formed in the central disc wall of the flywheel. The pawl 63 carries a projecting cam pin 63c that projects into the camming hole 80 to engage the cam surface 79. Because the gear 48a is stationary and the reel 40 carrying the pawl 63 is still turning relative to the stationary gear camming surface 79, the latter cams the pawl pin and pawl radially outwardly to engage pawl teeth 63(b) into engagement with the gear teeth 65 on the retractor frame 67.

Simultaneously at the other side of the retractor, at the time that the main pawl 63 is cammed into a blocking position with the teeth of the gear 65, the back-up pawl 62 is pivoted to bring its teeth into engagement with the left gear 65, as seen in FIG. 3A. The pawl 62 is pivoted with the pawl 63 by means of a pin 88 which spans the retractor frame 67. The pin has a square end 88a fitted into a square hole 62a at the pivot end of the back-up pawl 62. The pin has its other end projected into a camming hole (not shown) adjacent to the camming hole 80 shown in FIGS. 8, 9 and 10 to be engaged by camming surfaces 79 on the gear 48a. The pin 88 serves to rotate the pawl 62 into the gear teeth 65 in the manner that pin 63c pivots the pawl 63 into the gear teeth. Thus, the pivoting of the main pawl and the back-up pawl occurs simultaneously and through the same displacement. Thus, the retractor will have been moved into its blocking position in which belt protraction is blocked by the operation of the remote vehicle-sensitive device in the remote actuator 22.

At the retractor 20, the pawls 62 and 63a each have rounded pivot ends 62c and 63c (FIG. 3A) that seat in circular groove seats 90 formed in end walls 91 and 92 of the reel 40. The main pawls 62 and 63 are biased to its non-blocking position by a spring 94 (FIG. 3A).

Turning now to the other embodiment of the invention shown in FIGS. 4 and 5, the remote actuator 22a has a flywheel 51 that is pivotally mounted on the lock gear 48 by the pivot pin 99 on the lock gear 48. A flywheel spring 100 is connected at one end to the flywheel and its other end to tab 102 molded on the lock gear. The spring 100 biases the flywheel to the non-operative position of FIGS. 4 and 13 against a stop 104 on the lock gear. When the reel is rotated at a predetermined acceleration, the flywheel 51 pivots about its pivot pin 99 in a clockwise direction (FIGS. 4 and 13) from its inoperative position (FIGS. 4 and 13) to its operative position (FIG. 12) where it abuts another stop 106 (FIG. 4) which is molded integrally with the web 48c of the lock gear 48. In its operative position, a nose 108 on the flywheel will have been swung radially outwardly into the path of one of several internal projections or teeth 110 on the lockgear 48 to stop rotation of the lock gear 48. A stopping of rotation of the lock gear 48 at the remote actuator 22a by the flywheel also stops rotation of the cable 46; and thereby, the gear 48a at the retractor (FIG. 3A). The stopping of the retractor gear 48a causes the cam surfaces 79 thereon to pivot the pawl pin 63c and thereby the pawl 63 radially outwardly to engage the teeth 65 of retractor frame 67 in the manner described above. Thus, the remote web-sensitive actuator 22a will have actuated the retractor to its locked position preventing further belt protraction from the reel.

Thus, it will be seen that the remote actuator 22a may be formed of plastic parts except for the springs 100. The remote actuator 22 or 22a does not need to have the main locking pawl 63 or the locking teeth 65 that are present at the retractor to stop reel rotation. The remote actuator thus may be made of relatively inexpensive parts operating in the usual manner to stop rotation of the gear 48 and the cable 46.

Turning now to the illustrated retractor as shown in FIG. 3A, it will be described in greater detail. The retractor includes a coiled spring 120 mounted in a spring cover 122 with an inner end 124 of the spring fastened to a shaft coupler or bushing 126 that is mounted on the reel shaft 41 to rotate the shaft 41 and attached reel 40 in the rewind direction. The outer end of the spring is fastened to a spring case 130 which is suitably fastened to the outer side of the retractor frame plate 67. At the opposite side of the retractor, a cover 131 for the gear 48a is mounted to the retractor frame 67 and encloses the rotating flywheel 51 on the rotating gear 48. A webbing guide 134 and a tie bar 136 are also mounted on the retractor frame 67.

From the foregoing, it will be seen that a remote actuator has a mechanical connection with a vehicle-sensitive retractor which may be employed to operate the retractor disposed at attitudes that would otherwise not be possible. Further, it will be seen that a proven standard retractor may be used with a remote actuator so as to avoid the cost of employing a very unique design of retractor for remote operation by a mechanical connector. Also, the remote actuator may be both webbing sensitive and vehicle-sensitive in its operation. Also, it will be seen from the foregoing that both the retractor and the remote actuator may use substantially the same parts and have substantially the same manner of vehicle-sensitive and/or web-sensitive devices therein.

What is claimed is:

1. A seat belt retractor apparatus having a remote sensing of predetermined accelerations and operation of the retractor apparatus upon such sensing, said retractor apparatus comprising:

a seat belt retractor mounted at a first location and having a spring biased reel to rewind webbing thereon and having a blocking mechanism movable between a release position allowing webbing to protract from the reel and a locking position preventing protraction of the webbing;

a remote actuator for actuating the retractor between blocked and unblocked positions;

a vehicle-sensitive inertia operator in the remote actuator responsive to vehicle accelerations/decelerations;

a web-sensitive inertia operator in the seat belt retractor to operate the reel blocking mechanism in response to predetermined webbing acceleration; and a mechanical connector extending between the remote actuator and the retractor for mechanically actuating the reel blocking mechanism to its locking position by at least one of the remote, vehicle-sensitive and web-sensitive inertia operators.

2. A seat belt retractor apparatus having a remote sensing of predetermined accelerations and operation of the retractor apparatus upon such sensing, said retractor apparatus comprising:

a seat belt retractor mounted at a first location and having a spring biased reel to rewind webbing thereon and having a blocking mechanism movable between a release position allowing webbing to protract from the reel and a locking position preventing protraction of the webbing;

a remote actuator for actuating the retractor between blocked and unblocked positions;

a vehicle-sensitive inertia operator in the remote actuator responsive to vehicle accelerations/decelerations;

a web-sensitive inertia operator in the seat belt retractor to operate the reel blocking mechanism in response to predetermined webbing acceleration;

a connector between the remote actuator and the retractor for actuating the reel blocking mechanism to its locking position by at least one of the remote, vehicle-sensitive and web-sensitive inertia operators; and wherein the connector comprises a rotatable cable connected to the web-sensitive inertia operator to rotate the web-sensitive operator until predetermined acceleration is reached.

3. A seat belt retractor apparatus having a remote sensing of predetermined accelerations and operation of the retractor apparatus upon such sensing, said retractor apparatus comprising:

a seat belt retractor mounted at a first location and having a spring biased reel to rewind webbing thereon and having a blocking mechanism movable between a release position allowing webbing to protract from the reel and a locking position preventing protraction of the webbing;

a remote actuator for actuating the retractor between blocked and unblocked positions;

a vehicle-sensitive inertia operator in the remote actuator responsive to vehicle accelerations/decelerations;

a web-sensitive inertia operator in the seat belt retractor to operate the reel blocking mechanism in response to predetermined webbing acceleration;

a connector between the remote actuator and the retractor for actuating the reel blocking mechanism to its locking position by at least one of the remote, vehicle-sensitive and web-sensitive inertia operators; and wherein an outer sheath encases a rotatable cable of the connector.

4. A seat belt retractor apparatus having a remote sensing of predetermined vehicle decelerations and for locking the retractor apparatus against further belt protraction, said retractor apparatus comprising:

a seat belt retractor mounted at a first location and having a spring biased reel to rewind webbing thereon and having a blocking mechanism movable between a release position allowing webbing to protract from the reel and a locking position preventing protraction of the webbing;

a remote actuator for actuating the retractor between blocked and unblocked positions;

a rotatable member in said seat belt retractor and operable to actuate the blocking mechanism to its locking position;

a rotatable ratchet wheel in the remote actuator for rotation with the reel in the remote actuator;

a vehicle-sensitive inertia member in the remote actuator for stopping rotation of the rotatable ratchet wheel in response to a vehicle predetermined acceleration/deceleration; and a rotatable connector between the rotatable ratchet wheel in the remote actuator and the rotatable member in the retractor for stopping rotation of the rotatable member and thereby actuating the reel blocking mechanism to its blocking position by the remote, vehicle-sensitive inertia operator.

5. An apparatus in accordance with claim 4 wherein the rotatable connector comprises a rotatable cable connected between the rotatable ratchet wheel and the rotatable member.

6. An apparatus in accordance with claim 4 including a web-sensitive, inertia operator responsive to a predetermined web acceleration to operate the blocking mechanism in the seat belt retractor.

7. An apparatus in accordance with claim 6 wherein the web-sensitive, inertia operator is mounted on the seat belt retractor.

8. An apparatus in accordance with claim 6 wherein the web-sensitive, inertia operator is mounted in said remote actuator.

* * * * *